United States Patent [19]

Lichtin et al.

[11] 4,427,510

[45] Jan. 24, 1984

[54] LIGHT DRIVEN PHOTOCATALYTIC PROCESS

[75] Inventors: Norman N. Lichtin, Newton Center; Kalambella M. Vijayakumar, Allston, both of Mass.

[73] Assignee: Atlantic Richfield Company, Los Angeles, Calif.

[21] Appl. No.: 374,560

[22] Filed: May 3, 1982

[51] Int. Cl.³ .......................................... B01J 19/12
[52] U.S. Cl. .......................................... 204/157.1 R
[58] Field of Search ................ 204/157.1 R, 158 N, 204/157.1 L

[56] References Cited

U.S. PATENT DOCUMENTS 4,113,590  9/1978  Schrauzer et al. ........... 204/157.1 R Primary Examiner—Howard S. Williams
Attorney, Agent, or Firm—Roderick W. MacDonald

[57] ABSTRACT

A method for the light driven photocatalytic reduction of nitrogen to one or more compounds which comprises contacting certain metal oxides with nitrogen in the presence of a reducing agent such as water and in the absence of separate physical electrolyte and electrodes, and conducting said contacting in the presence of light.

13 Claims, No Drawings

LIGHT DRIVEN PHOTOCATALYTIC PROCESS

BACKGROUND OF THE INVENTION

Heretofore, the photocatalytic reduction of carbon dioxide in the presence of water into various organic compounds such as formaldehyde and methanol has been accomplished using various chemical compounds such as titanium dioxide, tungsten trioxide, lead oxide, iron oxide, calcium titanate, silicon carbide, and the like. See "Photoreduction of Carbon Dioxide and Water into Formaldehyde and Methanol on Semiconductor Materials" by Aurian-Blajeni, Halmann and Manassen, Solar Energy, Vol. 25, pp. 165-170, 1980. This photocatalytic process does not employ any physically separate electrodes or special electrolyte as does the classical electrolytic cell or photoelectrochemical cells as will be discussed in greater detail hereinafter. This photocatalytic process merely employs a catalytic material, preferably, dispersed in a carrier liquid for better carbon dioxide contacting purposes. The material to be reduced such as carbon dioxide, is brought into contact with the catalyst using light as a source of the energy of reduction.

Also heretofore, photoelectrochemical cells which employ two physically separate electrodes combined with a special electrolyte solution have been used to reduce carbon dioxide or the bicarbonate ion to organic compounds such as formaldehyde, methanol, and formic acid. These cells have employed silicon metal as one of the physically separate electrodes and carbon or the like as the counter electrode. In the operation of these cells at least part of the required energy of reduction is supplied by light energy, including solar radiation. See U.S. Pat. No. 4,219,392, issued Aug. 26, 1980 to Halmann.

Also, heretofore, the photoreduction of nitrogen to ammonia has been reported using titanium dioxide alone or in combination with $Fe_2O_3$ or doped with iron, cobalt, molybdenum, and nickel. See "Photolysis of Water and Photoreduction of Nitrogen on Titanium Dioxide", Journal of the American Chemical Society, Vol. 99, pp. 7189-7193, 1977. This reference also discloses that enhancement of ammonia production was not obtained where numerous other metals such as chromium, copper, palladium, silver, and vanadium were used, thereby demonstrating the lack of predictability in this area.

BRIEF SUMMARY OF THE INVENTION

Accordingly, it was surprising to discover that certain compounds individually act as a catalyst in a light driven photocatalytic process for the reduction of nitrogen.

There is provided, according to this invention, a method for the light driven photocatalytic reduction of nitrogen in the presence of a reducing agent to at least one nitrogen containing compound which comprises contacting certain metal compounds individually with nitrogen or a nitrogen-containing gas in the presence of light so that the energy of reduction is essentially supplied by said light.

This process distinguishes clearly over a photoelectrochemical process in that the process of this invention requires no physically separate electrodes or special electrolyte.

Accordingly, it is an object of this invention to provide a new and improved light driven photocatalytic method. It is another object to provide a new and improved method for a light driven photocatalytic reduction of nitrogen to other useful compounds. Other aspects, objects and advantages of this invention will be apparent to those skilled in the art from this disclosure and the appended claims.

DETAILED DESCRIPTION OF THE INVENTION

In accordance with this invention, nitrogen is reduced to at least one nitrogen containing compound such as ammonia and hydrazine. The reduction is accomplished by contacting certain individual metal compounds with nitrogen and conducting such contacting in the presence of a reducing agent such as water and light so that the energy of reduction of the nitrogen is essentially supplied by said light.

Thus, the useful nitrogen compounds produced by the method of this invention are obtained without the use of an external electrical bias, special electrodes, or special electrolyte solutions.

The light employed can be sunlight or artificial light or a combination of both and can vary over a wide wavelength range so long as at least part of the incident light is of a wavelength that is absorbed by the metal compound employed. The time period for exposure to light can vary widely, there being no upper limit on the time of exposure from an operational point of view. The time limit for each exposure is dictated more by economics.

It has been found that without incident light no measurable reduction takes place, and that with light and no metal compound, no measurable reduction takes place, so that the combination of light and the metal compound along with a reducing agent is necessary.

The metal compounds employed individually in accordance with this invention can be selected from the group consisting of cobalt oxides, La-Ti-Oxide, La-Fe-Oxide, La-Ni-Oxide, Pt-La-Ni-Oxide, La-Co-Oxide, lead oxides, chromium oxides, tungsten oxides, molybdenum oxides, praseodymium oxides, neodymium oxides, silica, boiling chips, and mixtures of iron oxides.

The metal compound or compounds are preferably employed in a subdivided form, for example, a powder, in order to expose a larger catalyst contacting surface to the nitrogen. The extent of subdivision is not critical to the operability of the process, it being well within the skill of the art to determine whether coarse or fine particles or a combination thereof are to be employed in a particular application.

The metal compound or mixture thereof is preferably dispersed in a carrier liquid to promote maximum contact between them and the nitrogen to be reduced. This carrier liquid is not employed as an electrolyte but is rather a physical suspension and mixing medium for the metal compound and nitrogen. The carrier helps provide maximum mixing and intimate contact between the materials in the presence of light. The carrier liquid is not critical as to its chemical composition, so long as it is chemically nondeleterious to the catalyst, the nitrogen to be reduced, and the reduction products. The carrier liquid can also serve as the reducing agent. Preferably, the carrier liquid is common water. The water may or may not have one or more chemical salts dissolved therein, but, unlike an electrolyte, the carrier need not have dissolved salts therein to any appreciable extent so far as the operation of this invention is concerned.

Other reducing agents that can be employed are hydrogen sulfide or organic waste materials such as sewage, vegetable matter or animal waste.

The amount of metal compound(s) and the amount and kind of reducing agent(s) employed in the process of this invention are not critical and can vary widely depending on economics and the like, the minimum criterion being only that an amount effective to obtain the desired reduction be present.

The metal compound can simply be exposed to the nitrogen to be reduced or, optionally, can first be heat treated to increase its activity when subsequently exposed to the nitrogen to be reduced. If the metal compound is heat treated prior to contact with the nitrogen to be reduced, it is preferably heated at a temperaure of from about 20° C. to about 600° C. for at least one hour. The heating can be carried out in air, an inert gas such as argon, hydrogen, or in a vacuum, and is preferably conducted for from about one hour to about forty-eight hours.

In the following examples, the metal compound was prepared by crushing to a fine powder in an agate mortar. In Examples 1 and 2 the thus crushed metal compound was dried and preconditioned by heating for twelve hours in argon at 300° C. In Example 3, the metal compound was not preconditioned.

In the examples, chemical grade nitrogen gas was used as the material to be reduced. Deionized tap water was employed as the carrier liquid.

The nitrogen was dispersed through a sintered disc into 30 milliliters of water carrying approximately 0.1 grams of the subdivided metal compound therein. Bubbling of the nitrogen through this aqueous suspension provided adequate mixing. The nitrogen flow rate was 20 to 120 cubic centimeters per minute at 1 atmosphere. The aqueous suspension was contained in a pyrex reaction cell and a 150 watt Xenon lamp with quartz lenses was employed approximately 30 centimeters from the pyrex reaction cell to supply the incident light required for operation of the process.

Effluent gas from the reactor was passed through two traps containing water which were immersed in common ice.

The contents of the reactor and the traps were analyzed after each run for ammonia. The ammonia content was determined spectrophotometrically using Nessler's reagent. Hydrazine was detected by the p-dimethlaminobenzaldehyde method.

EXAMPLE 1

Cobalt oxide (CoO) was employed as the metal compound.

The reaction time and temperature was approximately 30° C. and six hours. The run produced 1.3 micromoles of ammonia and a detectable amount of hydrazine.

EXAMPLE 2

In this example, an iron oxide mixture ($Fe_2O_3 + Fe_3O_4$) was used as the metal compound.

The run was carried out at about 30° C. for approximately six hours. The run produced 2.5 micromoles of ammonia.

EXAMPLE 3

In this example, La-Ti-Oxide was used as the metal compound.

The run was carried out at about 30° C. for about six hours, and produced 0.7 micromoles of ammonia.

EXAMPLE 4

In this example, various metal compounds were employed, some with preconditioning and some without. The reaction times and temperatures were also varied. In all runs ammonia was produced, and in some hydrazine was detected. It is interesting to note that silica (Ottawa Sand) did in fact reduce nitrogen to ammonia, because an attempt to photocatalytically reduce carbon dioxide to methane using Ottawa Sand failed to produce any methane.

The results of the various runs are set forth in Table I below.

TABLE I

| Catalyst | % w/v of Catalyst | Temp. of Conditioning of Catalyst, °C. | Atm. of Conditioning of Catalyst | Light | Length of Exposure, hrs. | Avg. Yield of $NH_3$, $\mu$mole/hr.$^{-1}$ |
|---|---|---|---|---|---|---|
| $Co_3O_4$ | 0.3 | 300 | Argon | Xenon | 80 | 0.13 |
| La-Fe-Oxide | 0.3 | — | — | Xenon | 96 | 0.05 |
| La-Ni-Oxide | 0.3 | — | — | Xenon | 52 | 0.01 |
| Pt-La-Ni-Oxide | 0.3 | — | — | Xenon | 36 | 0.03 |
| La-Co-Oxide | 0.01 | 300 | Argon | $\lambda > 350$nm | 15 | 0.32 |
| $Co_3O_4$ | 0.01 | 300 | Argon | Xenon | 15 | 0.27 |
| $Pb_3O_4$ | 0.33 | 300 | Argon | $\lambda > 420$nm | 15 | 0.18$^a$ |
| PbO | 0.33 | 300 | Argon | $\lambda > 420$nm | 15 | 0.125 |
| $Cr_2O_3$ | 0.33 | 400 | Argon | $\lambda > 350$nm | 15 | 0.26$^a$ |
| $WO_3$$^b$ | 0.33 | 300 | Argon | $\lambda > 350$nm | 17 | 0.155 |
| $MoO_3$ | 0.33 | 300 | Argon | $\lambda > 350$nm | 15 | 0.16 |
| Pr-Oxide | 0.33 | 300 | Argon | $\lambda > 420$nm | 14 | 0.19 |
| $Nd_2O_3$ | 0.33 | 300 | Argon | $\lambda > 350$nm | 14 | 0.10 |
| Silica (Ottawa Sand) | 0.33 | 1000 | Air | $\lambda > 420$nm | 5 | 0.58 |
| Boiling Chips (Fisher) | 0.33 | 500 | Air | Xenon | 7.5 | 0.39 |

$^a$Hydrazine detected
$^b$Colloidal

Reasonable variations and modifications are possible within the scope of this disclosure without departing from the spirit and scope of this invention.

We claim:

1. A method for the light driven photocatalytic reduction of nitrogen to at least one nitrogen-containing compound which comprises contacting one metal compound selected from the group consisting of cobalt oxides, La-Fe-Oxide, La-Ni-Oxide, Pt-La-Ni-Oxide, La-Co-Oxide, lead oxides, chromium oxides, tungsten oxides, molybdenum oxides, praseodynium oxides, neodymium oxides, silica, boiling chips, and a mixture of iron oxides, with nitrogen or a nitrogen-containing gas in the presence of a reducing agent and in the absence of separate physical electrolyte and electrodes, and conducting said contacting in the presence of light having a wave length greater than 420 nanometers so that the energy of reduction is essentially supplied by said light.

2. The method according to claim 1 wherein said nitrogen-containing compound is at least one of ammonia and hydrazine.

3. The method according to claim 1 wherein said metal compound is selected from the group consisting of mixtures of oxides of iron, CoO, $Co_3O_4$, La-Fe-Oxide, La-Ni-Oxide, Pt-La-Ni-Oxide, La-Co-Oxide, PbO, $Pb_3O_4$, $Cr_2O_3$, $WO_3$, $MoO_3$, Pr-Oxide, $Nd_2O_3$, silica, and boiling chips.

4. The method according to claim 1 wherein said reducing agent is an aqueous carrier liquid.

5. The method according to claim 1 wherein said reducing agent is water.

6. The method according to claim 4 wherein said metal compound is dispersed in said carrier liquid and said nitrogen is carried to said metal compound by said liquid.

7. The method according to claim 1 wherein said metal compound is in subdivided form.

8. The method according to claim 7 wherein said metal compound is subdivided into powder form.

9. The method according to claim 1 wherein air is employed as the nitrogen containing gas.

10. The method according to claim 1 wherein said metal compound is heat treated prior to contact with nitrogen by heating at a temperature of from about 20° C. to about 600° C. for at least one hour in air, an inert gas, or hydrogen.

11. The method according to claim 10 wherein said heat treatment is for from about one hour to about forty-eight hours in argon or air.

12. The method according to claim 10 wherein said heat treatment is for from about one hour to about forty-eight hours in argon or hydrogen.

13. The method according to claim 1 wherein said light has a wavelength range such that at least part of said light is absorbed by said metal compound.

* * * * *